United States Patent
Machado et al.

(10) Patent No.: US 11,254,895 B2
(45) Date of Patent: Feb. 22, 2022

(54) OILSEED EXTRACTION METHOD

(71) Applicant: Bunge Global Innovation, LLC, White Plains, NY (US)

(72) Inventors: Rogerio Pereira Machado, Blumenau (BR); Fabiano Luft Ferreira, Blumenau (BR)

(73) Assignee: Bungle Global Innovation, LLC, Chesterfield, MO (US)

( * ) Notice: Subject to any disclaimer, the term of this patent is extended or adjusted under 35 U.S.C. 154(b) by 217 days.

(21) Appl. No.: 16/567,493

(22) Filed: Sep. 11, 2019

(65) Prior Publication Data
US 2020/0086230 A1    Mar. 19, 2020

Related U.S. Application Data

(60) Provisional application No. 62/730,707, filed on Sep. 13, 2018.

(51) Int. Cl.
| | | |
|---|---|---|
| *C11B 1/10* | (2006.01) | |
| *B01D 11/02* | (2006.01) | |
| *A23K 10/30* | (2016.01) | |
| *A23J 1/14* | (2006.01) | |

(52) U.S. Cl.
CPC . *C11B 1/10* (2013.01); *A23J 1/14* (2013.01); *A23J 1/142* (2013.01); *A23K 10/30* (2016.05); *B01D 11/028* (2013.01); *B01D 11/0288* (2013.01); *C11B 1/102* (2013.01)

(58) Field of Classification Search
CPC ..... C11B 1/10; C11B 1/102; A23J 1/14; A23J 1/142; B01D 11/028; B01D 11/0288
See application file for complete search history.

(56) References Cited

U.S. PATENT DOCUMENTS

| | | | |
|---|---|---|---|
| 2,615,905 A | 10/1952 | Heinrich et al. | |
| 3,365,440 A * | 1/1968 | Circle | A23J 1/142 530/378 |
| 3,557,168 A * | 1/1971 | Pons, Jr. et al. | C11B 1/04 554/14 |
| 3,878,195 A | 4/1975 | Taillie et al. | |
| 2006/0165870 A1 | 7/2006 | Lindsey et al. | |

(Continued)

FOREIGN PATENT DOCUMENTS

| | | | |
|---|---|---|---|
| EP | 0004848 A2 | 10/1979 | |
| FR | 2516537 A1 | 5/1983 | |

(Continued)

OTHER PUBLICATIONS

Eldridge, A.C., et al., Laboratory evaluation of hexane:alcohol azeotrope-extracted soybean flakes as a source for bland protein isolates, American Association of Cereal Chemists, Cereal Chemistry, vol. 48, No. 6, pp. 640-646 (Year: 1971).*

(Continued)

*Primary Examiner* — Yate' K Cutliff
(74) *Attorney, Agent, or Firm* — Armstrong Teasdale LLP

(57) ABSTRACT

The present disclosure provides for improved oilseed extraction methods using sequential extractions with polar solvents and non-polar solvents or extractions with an azeotrope of a polar solvent and a non-polar solvent to produce oilseed meal concentrates having increased protein content and reduced soluble carbohydrate and anti-nutritional compound content.

12 Claims, 7 Drawing Sheets

(56) References Cited

U.S. PATENT DOCUMENTS

| 2009/0130247 | A1 |   | 5/2009  | Purtle et al. |            |
|--------------|----|---|---------|---------------|------------|
| 2013/0134351 | A1 | * | 5/2013  | Bathurst      | C10G 3/40  |
|              |    |   |         |               | 252/183.13 |
| 2013/0323380 | A1 | * | 12/2013 | Kellens       | A23J 1/142 |
|              |    |   |         |               | 426/430    |

FOREIGN PATENT DOCUMENTS

| GB | 1385600    | A  |   | 2/1975  |          |
|----|------------|----|---|---------|----------|
| GB | 2110519    | A  | * | 6/1983  | C11B 1/10|
| WO | 2011161665 | A1 |   | 12/2011 |          |

OTHER PUBLICATIONS

Kuk, M.S., et al., Cottonseed extraction with mixtures of acetone and hexane, JAOCS, vol. 82, No. 8, pp. 609-612 (Year: 2005).*

Honig et al., "Lipids of Defatted Soybean Flakes: Extraction and Characterization", Food Technology, Jun. 1, 1969, vol. 23, pp. 95-100.

International Search Report and Written Opinion for PCT/US2019/050591, dated Dec. 13, 2019, 17 pages.

* cited by examiner

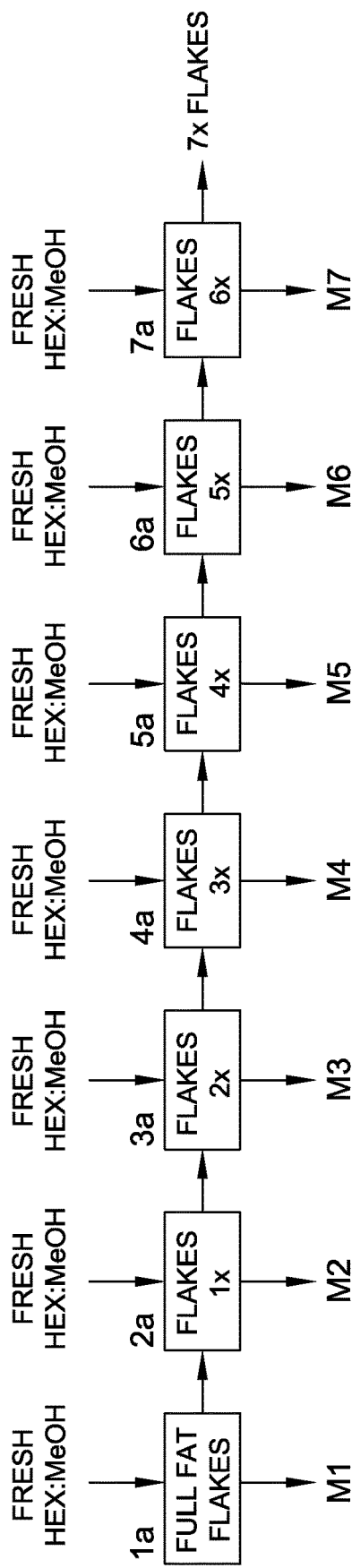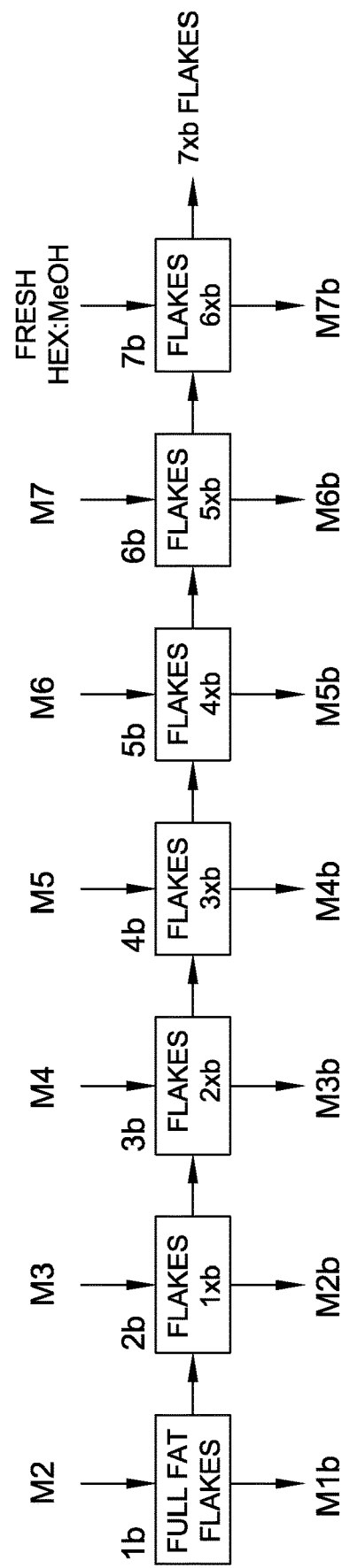
FIG. 4A
FIG. 4B

OILSEED EXTRACTION METHOD

CROSS-REFERENCE TO RELATED APPLICATION

This application claims priority benefit of U.S. Provisional Application No. 62/730,707 filed on Sep. 13, 2018, the contents of which are incorporated herein in their entirety.

BACKGROUND

The field of the disclosure relates generally to extraction of oil, soluble carbohydrates and anti-nutritional compounds from oilseeds.

Oils from oilseeds, such as rapeseed, soybean, and sunflower, are typically extracted by pressing, solvent extraction or both to produce oils that will be further processed and eventually refined for different uses. Both processes generate meals that are used mainly for animal feed. Pressed meals can be marketed directly without further processing, but solvent extracted meals must be desolventized and toasted prior to marketing.

In the case of soy, preparation of full-fat flaked soy for extraction involves cleaning of the oilseed, followed by cracking, dehulling, conditioning and flaking. In prior art processes, the full fat soy flakes are extracted with hexane to generate a miscella stream enriched in oil and an extracted meal. In the case sunflower or rapeseed, the oil extraction typically occurs in a first pressing stage to generate oil and cake, and a second solvent extraction step to generate a miscella stream enriched in oil and an extracted meal. In any of the various prior art extraction methods, the extracted meal is desolventized/toasted at elevated temperature to generate meal and the miscella is distilled to generate crude oil and recovered solvent for recycle. In addition to desirable protein, the meal characteristically contains undesired anti-nutritional compounds including, without limitation, allergenic proteins, soluble carbohydrates, phytates, saponins, protease inhibitors, polyphenolics, tannins, lectins, and gluconates.

The desolventized/toasted meal may be further processed to produce meal concentrates having reduced levels of soluble carbohydrates and anti-nutritionals. Typically, such further processing is a second extraction with water-ethanol mixtures to remove soluble carbohydrates and some anti-nutritionals. Prior art extraction processes are typically designed to maximize oil removal, without regard to the composition of the resulting meal. Desolventizing/toasting inactivates a portion of one or more of the anti-nutritional compounds. Problematically, desolventizing/toasting results in a Maillard reaction between sugars and proteins thereby rendering a portion of the sugars unavailable for subsequent extraction (such as with ethanol/water), reducing the digestable protein value of the meal, and reducing extraction efficiency for removal of soluble carbohydrates (e.g., sugars) and anti-nutritional compounds. More particularly, in prior art processes, about 10% of the soluble carbohydrates became unavailable when the meal is desolventized under vacuum and between about 25% to 35% of the soluble carbohydrates became unavailable when the meal is desolventized without vacuum and toasting.

A need therefore exists for improved processes for extracting oil, soluble carbohydrates and anti-nutritional compounds from oilseed meal thereby providing for meal concentrates having increased protein content, and reduce anti-nutritional compound content.

BRIEF DESCRIPTION

In some aspects of the present disclosure, a method for extracting oil and soluble carbohydrates from oilseeds to form extracted oilseed meal is provided. The method comprises steps (a) and (b), as detailed below, performed in any order.

In at least one soluble carbohydrate extraction step (a), (i) full-fat flaked oilseed or extracted oilseed meal comprising oil, protein and soluble carbohydrates is contacted with an organic polar solvent and water and (ii) the polar solvent and water are separated to form extraction polar solvent comprising soluble carbohydrates, and extracted oilseed meal.

In at least one oil extraction step (b), (i) full-fat flaked oilseed or crude extracted oilseed meal comprising oil, protein and soluble carbohydrates is contacted with a non-polar solvent and (ii) the non-polar solvent is separated to form extraction non-polar solvent comprising oil and extracted oilseed meal.

The extracted full-fat flaked oilseed meal following the at least one soluble carbohydrate extraction step or the at least one oil extraction step is termed crude extracted oilseed meal. The extracted full-fat flaked oilseed meal following both of the at least one soluble carbohydrate extraction step and the at least one oil extraction step is termed finished extracted oilseed meal.

The extraction polar solvent comprises at least 50 wt. % of the soluble carbohydrates contained in the solid full-fat flaked oilseed The extraction non-polar solvent comprises at least 75 wt. % of the oil contained in the solid full-fat flaked oilseed. The finished extracted oilseed meal is characterized by a wt. % ratio of protein to oil of at least 55:1 and a wt. % ratio of protein to carbohydrate of at least 10:1. The solid full-fat flaked oilseed has not been previously extracted with a solvent or previously heat treated.

In some other aspects of the present disclosure, a method for extracting oil and soluble carbohydrates from oilseeds to form extracted oilseed meal is provided. The method comprises steps (a) and (b), as detailed below.

In extraction step (a), solid full-fat flaked oilseed comprising oil, protein and soluble carbohydrates is contacted with an azeotrope of a polar solvent and a non-polar solvent. In such aspects, the solid full-fat flaked oilseed has not been previously extracted with a solvent or previously heat treated. In separation step (b), the azeotropic solvent is separated to form (i) extraction azeotropic solvent comprising soluble carbohydrates and oil and (ii) extracted oilseed meal. The extracted oilseed meal may be extracted at least one additional time according to steps (a) and (b). The extraction azeotropic solvent comprises at least 75 wt. % of the oil contained in the solid full-fat flaked oilseed. The extracted oilseed meal is characterized by a wt. % ratio of protein to oil of at least 55:1 and a wt. % ratio of soluble carbohydrates to oil of at least 4:1.

BRIEF DESCRIPTION OF THE DRAWINGS

FIG. 4A depicts the protocol of example 2 for the generation of miscella streams, designated as M1 to M7, by sequential extraction of full fat flaked soy with an azeotrope of hexane and methanol ("Hex:MeOH"). FIG. 4B depicts the protocol of example 2 for the countercurrent extraction of full fat flaked soy with the miscella streams in the order of M2 to M7, followed by fresh Hex:MeOH, where "7×b Flakes" refer to finished extracted flaked soy.

DETAILED DESCRIPTION

Figure 1A:
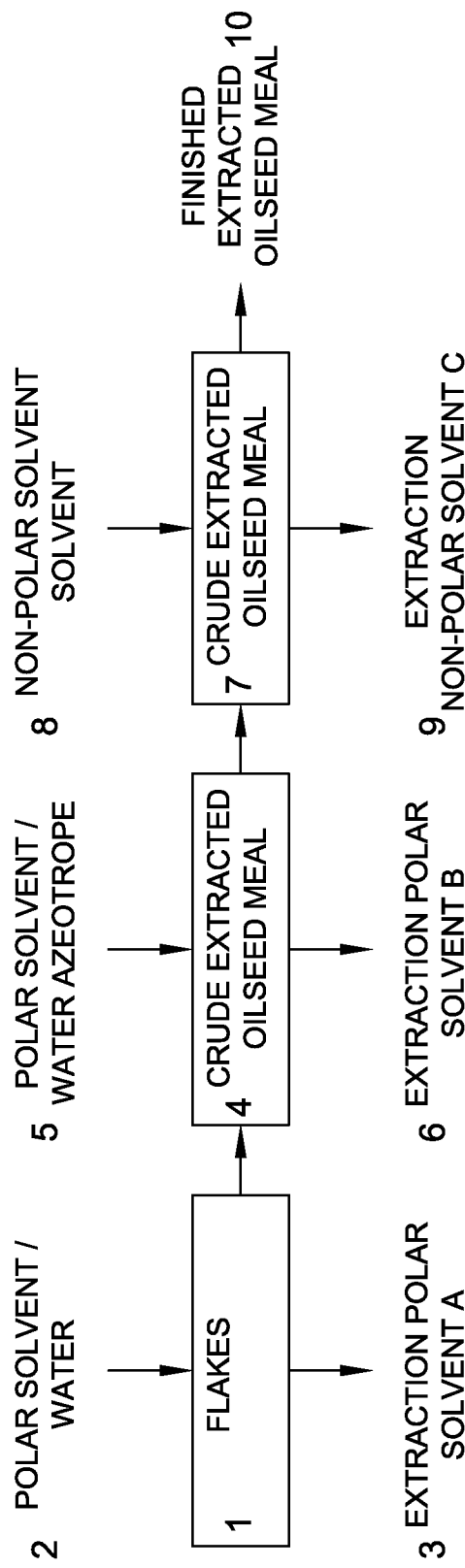
FIG. 1A depicts one aspect of the present disclosure for the extraction of soluble carbohydrates and oil from flaked oilseed by the sequence of extraction with polar solvent and water, extraction with an azeotrope of a polar solvent and water, and extraction with a polar solvent.

The present disclosure is related to improved oilseed extraction methods to produce oilseed meal concentrates having increased protein content and reduced soluble carbohydrate (e.g., sugars) and anti-nutritional compound content. More particularly, the extraction methods of the present disclosure eliminate the need for a desolventizing/toasting step prior to soluble carbohydrate extraction thereby allowing for increased oil extraction efficiency compared with prior art processes while allowing for effective removal of from about 20% up to about 90% of the soluble carbohydrates (e.g., sugars) and anti-nutritional compounds.

In some aspects of the present disclosure, the oilseed extraction method comprises extracting oil and soluble carbohydrates from flaked oilseed meal in a first extraction step comprising sequentially extracting the flaked oilseed meal with an organic polar solvent comprising water to extract soluble carbohydrates and anti-nutritional compounds followed by extraction with a non-polar solvent to extract soluble carbohydrates, or vice versa.

In some other aspects of the present disclosure, the oilseed extraction method comprises simultaneously extracting oil and soluble carbohydrates from flaked oilseed meal with an azeotrope of a polar solvent (such as an organic polar solvent comprising water) and a non-polar solvent.

Suitable oilseeds for the present disclosure include, without limitation, soybean, sunflower, corn, canola (rapeseed), sesame, palm kernel, cotton, flax, and peanut.

The typical compositions of various oilseeds are indicated in Table A below on a dry basis:

TABLE A

|  | Soy | Sunflower | Cottonseed | Safflower |
| --- | --- | --- | --- | --- |
| Soluble Carbohydrates | 15% | 11% | 22% | 34% |
| Oil | 18% | 51% | 36% | 38% |
| Protein | 38% | 21% | 33% | 16% |
| Moisture | 9% | 5% | 4% | 8% |
| Insoluble Carbohydrates/ Ash/Other | 20% | 12% | 5% | 4% |

As used herein, "soluble carbohydrate" generally refers to carbohydrates having a solubility of a least at least 5 g/L, at least 10 g/L, at least 25 g/L or at least 50 g/L at 25° C. in the polar solvents described herein. Non-limiting examples of soluble carbohydrates include sucrose; fructose; maltose; galactose; glucose; oligosaccharides (e.g., raffinose, stachyose, and verbascose); myo-inositol; galactinol; digalactosyl myo-inositol; trigalactosyl myo-inositol; D-pinitol; galactopinitol A; digalactosyl pinitol A (ciceritol); trigalactosyl pinitol A; galactopinitol B; D-chiro-inositol; fagopyritol B1; fagopyritol B2; fagopyritol B3; D-ononitol; galactosyl d-ononitol; and digalactosyl d-ononitol.

As used herein, "sugar" generally refers to mono-, di- and tri-saccharides including, without limitation, sucrose, fructose, glucose, galactose, maltose, stachyose and raffinose.

In any of the various aspects of the present disclosure, the oilseed may suitably be processed by methods known in the art to produce the flaked oilseed starting material. Such oilseed processing typically comprises the following order of steps: cleaning, cracking, dehulling, conditioning, and flaking. Cleaning typically involves metal removal (such as with a magnet separator) followed by screening to remove undersize (such as sand) and oversize impurities (such a paper, plastic, etc.). Cracking involves reducing the oilseed size (such as reducing a seed to 4-6 pieces) and making the oil-bearing portion of the seed (meat) available for extraction, and typically involves passing cleaned oilseed through cracking rolls to break open the seeds and reduce the size to a specified size range. Cracked seeds may be dehulled such as by air aspiration and optional screening where the light hulls are separated from the heavy oil-bearing (meat) portion of the seed. The meat may be conditioned by heating, such as to about 40-70° C., and optionally dried at a temperature of up to about 80° C. The conditioned meat is then flaked to reduce the thickness to, for example, from about 0.75 mm to about 0.25 mm in order to increase the extraction surface area and disrupt/rupture oil cells thereby improving extraction efficiency.

In some embodiments of the disclosure, the solid full-fat flaked oilseed has not been previously extracted with a solvent or previously heat treated.

Various extraction solvents, solvent systems and azeotropes are within the scope of the present disclosure.

Suitable organic polar solvents include, without limitation, methanol, ethanol, i-propanol, n-propanol, n-butanol, tetrahydrofuran, ethyl acetate, acetone, and dimethylformamide, and combinations thereof. In some aspects, the organic polar solvent is an alcohol. In some aspects the organic polar solvent is methanol or ethanol. In some other aspects, the organic polar solvent is a combination of water and an alcohol, such as methanol and water or ethanol and water. Organic polar solvents are generally suitable for extracting hydrophilic oilseed components such as soluble carbohydrates and other anti-nutrients.

Suitable non-polar solvents include, without limitation, saturated hydrocarbons. Non-limiting examples include pentane, cyclopentane, hexane, and cyclohexane, and mixtures thereof. In some aspects, the non-polar solvent is hexane. Non-polar solvents are generally suitably for extracting the hydrophobic oil from oilseeds.

Azeotropes include, without limitation, the combination of an alcohol and water, and the combination of an organic polar solvent as described elsewhere herein and a non-polar solvent as described elsewhere herein. Azeotropes of an organic polar solvent and a non-polar solvent are suitable for extracting both hydrophilic and hydrophobic oilseed components. Solvent concentrations required to establish azeotropes are generally known in the art. For instance, ethanol/water binary azeotropes comprise about 3 wt. % water, about 3.5 wt. % water, about 4 wt. % water, about 4.5 wt. % water or about 5 wt. % water with the remainder being ethanol. n-propanol/water binary azeotropes comprise about 17 wt. % water, about 17.5 wt. % water, about 18 wt. % water, about 18.5 wt. % water, about 19 wt. % water, or about 19.5 wt. % water with the remainder being n-propanol. i-propanol/water binary azeotropes comprise about 37 wt. % water, about 37.5 wt. % water, about 38 wt. % water, about 38.5 wt. % water, about 39 wt. % water, or about 39.5 wt. % water with the remainder being i-propanol. Methanol/hexane binary azeotropes comprise about 26 wt. % methanol, about 26.5 wt. % methanol, about 27 wt. % methanol, about 27.5 wt. % methanol, about 28 wt. % methanol, about 28.5 wt. % methanol, about 29 wt. % methanol, about 29.5 wt. % methanol, or about 30 wt. % methanol with the remainder being hexane. Ethanol/hexane binary azeotropes comprise about 18 wt. % ethanol, about 18.5 wt. % ethanol, about 19 wt. % ethanol, about 19.5 wt. % ethanol, about 20 wt. % ethanol, about 20.5 wt. % ethanol, about 21 wt. % ethanol, about 21.5 wt. % ethanol, or about 22 wt. % ethanol with the remainder being hexane. Ternary azeotropes comprising an organic polar solvent, a non-polar solvent and water, such as—for instance and without limitation—ethanol/hexane/water and methanol/hexane/water are also within the scope of the present disclosure.

In some aspects, extraction with an azeotrope as described elsewhere herein, may result in a miscella having two phases. In some such aspects, an upper phase may comprise predominantly all of the non-polar solvent (e.g., about 95%) and predominantly all of the seed oil (e.g., at least 95%), and a lower phase may comprise predominantly all of the polar solvent(s) (e.g. about 90%) and predominantly all of the soluble carbohydrate (e.g., at least 95%). As used herein "predominantly all" refers to at least 75%, at least 85%, at least 90%, at least 90%, at least 95%, at least 98% or at least 99% on a volume percent or weight percent basis.

Commercial-scale equipment known in the art is generally suitable for extracting oil and soluble carbohydrates from oilseeds according to the methods of the present disclosure.

In some aspects of the present disclosure, the oilseed extraction method comprises extracting soluble carbohydrates from flaked oilseed meal in a soluble carbohydrate extraction step with a solvent comprising an organic polar solvent and water, and extracting oil from the flaked oilseed meal in an oil extraction step with a solvent comprising a non-polar solvent. The extraction steps may be done in any order.

The soluble carbohydrate extraction may comprise at least one extraction, or multiple extractions. The soluble carbohydrate extraction scheme may suitably be a batch extraction, a semi-continuous extraction or a continuous extraction. In some embodiments, the soluble carbohydrate extraction is counter-current.

In some such embodiments, the soluble carbohydrate extraction may be done with an organic polar solvent, optionally comprising from about 10 wt. % water to about 50 wt. % water. In some such embodiments, the organic polar solvent is an alcohol, such as for instance methanol or ethanol. In some particular aspects, the organic polar solvent is ethanol. In some particular embodiments, a combination of an organic polar solvent and water is employed wherein the water content is about 10 wt. %, about 15 wt. %, about 20 wt. %, about 25 wt. %, about 30 wt. %, about 35 wt. %, about 40 wt. %, about 45 wt. %, or about 50 wt. %, and ranges constructed therefrom, such as, from about 10 wt. % to about 50 wt. %, from about 20 wt. % to about 40 wt. %, or from about 25 wt. % to about 35 wt. %. In some embodiments, 1 extraction or 2, 3, 4, 5, 6, 7, 8, 9 or 10 sequential extractions, and ranges constructed therefrom, such as 2 to 8 extractions, 3 to 7 extractions, or 4 to 6 extractions of flaked oilseed is done with an organic polar solvent (e.g., ethanol), optionally comprising from about 10 wt. % water to about 50 wt. % water. A counter-current extraction scheme may optionally be done.

In some such embodiments, the soluble carbohydrate extraction may be done with an azeotrope of an organic polar solvent and water as described elsewhere herein. In some particular embodiments, the azeotrope is ethanol: water. In some embodiments, 1 extraction or 2, 3, 4 or 5 sequential extractions, and ranges constructed therefrom, such as 2 to 5 extractions or 1 to 3 extractions, with the azeotrope may be done. For multiple extraction embodiments, a counter-current extraction scheme may optionally be done. For instance, an azeotropic extraction may reduce the water content in extracted oilseed by about 0.5 wt. %, about 0.6 wt. %, about 0.7 wt. %, about 0.8 wt. %, about 0.9 wt. % or about 1 wt. %.

In some embodiments, the soluble carbohydrate extraction may be done with at least one first soluble carbohydrate extraction with an organic polar solvent, optionally comprising from about 10 wt. % water to about 50 wt. % water, followed by a at least one second soluble carbohydrate extraction with an azeotrope of an organic polar solvent and water (such as ethanol:water). One such extraction embodiment scheme is generally depicted in FIG. 1A where full fat oilseed flakes 1 are extracted at least once with non-azeotropic organic polar solvent:water 2 to form extraction polar solvent A 3 and crude extracted oilseed meal 4. Crude extracted oilseed meal 4 is extracted at least once with an organic polar solvent/water azeotrope 5 to form extraction polar solvent B 6 and crude extracted oilseed meal 7 is extracted with the non-polar solvent 8 resulting the solvent C 9. The process generated the extracted meal 10.

Figure 1B:
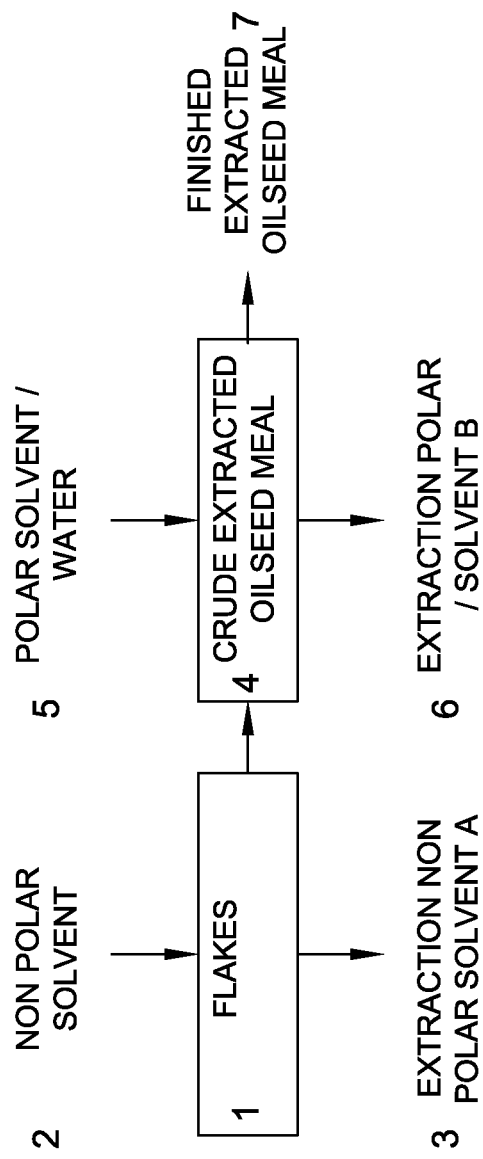
FIG. 1B depicts one aspect of the present disclosure for the extraction of soluble carbohydrates and oil from flakes oilseed by the sequence of extraction with non-polar solvent followed by polar solvent and water.

In some other embodiments, as generally depicted in FIG. 1B, full fat oilseed flakes 1 are extracted at least once with non-polar solvent 2 to form extraction polar solvent A 3 and crude extracted oilseed meal 4. The Crude extracted oilseed meal 4 is extracted at least once with an organic polar solvent/water 5 to form the finished meal 7 and the resulting solvent B 6.

In any of the various soluble carbohydrate extractions, the weight ratio of solvent to oilseed is about 0.5:1, about 0.75:1, about 1:1, about 1.1:1, about 1.5:1, about 2:1, about 2.5:1, about 3:1, about 3.5:1, or about 4:1, and ranges constructed therefrom, such as from about 0.5:1 to about 4:1, from about 1:1 to about 3:1, from about 1.1:1 to about 3:1, from about 1.1:1 to about 2:1, or from about 1.1:1 to about 1.5:1. In some such embodiments, the solvent in at least one soluble carbohydrate extraction step is present in wt. % excess as compared to the oilseed meal. In some embodiments, the solvent in each soluble carbohydrate extraction step is present in wt. % excess as compared to the oilseed meal.

The soluble carbohydrate extraction temperature is suitably about 25° C., about 30° C., about 35° C., about 40° C., about 45° C., about 50° C., about 55° C., about 60° C., about 65° C., about 70° C., up to about 5° C. less than the boiling point of the extraction solvent, and ranges constructed therefrom, such as from about 25° C. to about 5° C. less than the solvent boiling point, from about 40° C. to about 5° C. less than the solvent boiling point, from about 40° C. to about 70° C., from about 50° C. to about 70° C., or from about 55° C. to about 65° C.

In any of the various soluble carbohydrate extraction embodiments, at least 20 wt. %, at least 30 wt. %, at least 40 wt. %, at least 50 wt. %, at least 60 wt. %, at least 70 wt. %, at least 80 wt. % or at least 90 wt. % of the soluble carbohydrates contained in the oilseed meal is extracted into the polar solvent.

In any of the various sugar extraction embodiments, where sugar extraction is done prior to oil extraction, the oilseed having sugar extracted therefrom, termed crude extracted oilseed meal, may be characterized as follows. A total protein content of about 45 wt. %, about 46 wt. %, about 47 wt. %, about 48 wt. %, about 49 wt. %, about 50 wt. %, about 51 wt. %, about 52 wt. %, about 53 wt. %, about 54 wt. %, about 55 wt. %, about 56 wt. %, about 57 wt. %, about 58 wt. %, about 59 wt. %, or about 60 wt. % and ranges constructed therefrom, such as from about 45 wt. % to about 60 wt. %, from about 45 wt. % to about 55 wt. %, or from about 48 wt. % to about 53 wt. %. A total soluble carbohydrate content of less than 10 wt. %, less than 5 wt. %, about 2.5 wt. %, about 3 wt. %, about 3.5 wt. %, about 4 wt. %, about 4.5 wt. %, about 5 wt. %, about 5.5 wt. %, or about 6 wt. %, and ranges constructed therefrom, such as from about 2.5 wt. % to about 6 wt. %, or from about 3 wt. % to about 5 wt. %. The total oil content is generally commensurate with the oil content of unextracted oilseed. A weight ratio of protein to oil of about 1.8:1, about 1.9:1, about 2:1, about 2.1:1, about 2.2:1, about 2.3:1, about 2.4:1 or about 2.5:1, and ranges constructed therefrom, such as from about 1.8:1 to about 2.5:1 or from about 1.8:1 to about 2.2:1. A weight ratio of soluble carbohydrate to protein of about 0.4:1, about 0.35:1, about 0.3:1, about 0.25:1, about 0.2:1, about 0.15:1, or about 0.1:1, and ranges constructed therefrom, such as from about 0.1:1 to about 0.4:1, or from about 0.15:1 to about 0.3:1. A weight ratio of protein to soluble carbohydrate of about 10:1, about 11:1, about 12:1, about 13:1, about 14:1, about 15:1, or about 16:1, and ranges constructed therefrom, such as from about 10:1 to about 16:1, or from about 12:1 to about 14:1.

The oil extraction may comprise at least one extraction, or multiple extractions. The oil extraction scheme may suitably be a batch extraction, a semi-continuous extraction or a continuous extraction. In some embodiments, the oil extraction is counter-current.

In some such embodiments, the oil extraction may be done with a non-polar solvent as described elsewhere herein. In some particular aspects, the non-polar solvent is hexane. In some embodiments, 1 extraction or 2, 3, 4, 5, 6, 7, 8, 9 or 10 sequential extractions, and ranges constructed therefrom, such as 2 to 8 extractions, 1 to 6 extractions, 2 to 6 extractions, 2 to 5 extractions, or 3 to 5 extractions of oilseed with a non-polar solvent may be done. A counter-current extraction scheme may optionally be done.

One such oil extraction embodiment is depicted in FIG. 1A where crude extracted oilseed meal 7 is extracted at least once with non-polar solvent 8 to form extraction non-polar solvent 9 and finished extracted oilseed meal 10 and in FIG. 1B where flakes 1 is extracted at least once with a non-polar solvent 2 to form a extraction non-polar solvent 3.

In any of the various oil extractions, the weight ratio of non-polar solvent to oilseed is about 0.5:1, about 0.75:1, about 1:1, about 1.1:1, about 1.5:1, about 2:1, about 2.5:1, about 3:1, about 3.5:1 or about 4:1, and ranges constructed therefrom, such as from about 0.5:1 to about 4:1, from about 1:1 to about 3:1, from about 1.1:1 to about 3:1, from about 1.1:1 to about 2:1, or from about 1.1:1 to about 1.5:1. In some such embodiments, the solvent in at least one oil extraction step is present in wt. % excess as compared to the oilseed meal. In some embodiments, the solvent in each oil extraction step is present in wt. % excess as compared to the oilseed meal.

In any of the various oil extraction embodiments, at least 55 wt. %, at least 60 wt. %, at least 65 wt. %, at least 70 wt. %, at least 75 wt. %, at least 80 wt. %, at least 85 wt. %, or at least 90 wt. % of the oil contained in the full-fat oilseed meal is extracted into the non-polar solvent.

The oil extraction temperature is suitably about 25° C., about 30° C., about 35° C., about 40° C., about 45° C., about 50° C., about 55° C., about 60° C., about 65° C., about 70° C., up to about 5° C. less than the boiling point of the extraction solvent, and ranges constructed therefrom, such as from about 25° C. to about 5° C. less than the solvent boiling point, from about 40° C. to about 5° C. less than the solvent boiling point, from about 40° C. to about 70° C., from about 50° C. to about 70° C., or from about 55° C. to about 65° C.

In any of the various oil extraction aspects involving separate extractions with organic polar solvent and with non-polar solvent, the oilseed having soluble carbohydrate and oil extracted therefrom, also termed finished extracted oilseed meal, may be characterized as follows. A total protein content of about 55 wt. %, about 56 wt. %, about 57 wt. %, about 58 wt. %, about 59 wt. %, about 60 wt. %, about 61 wt. %, about 62 wt. %, about 63 wt. %, about 64 wt. %, about 65 wt. %, about 66 wt. %, about 67 wt. %, about 68 wt. %, about 69 wt. %, about 70 wt. %, about 71 wt. %, about 72 wt. %, about 73 wt. %, about 74 wt. %, or about 75 wt. %, and ranges constructed therefrom, such as from about 55 wt. % to about 75 wt. %, from about 60 wt. % to about 75 wt. %, from about 55 wt. % to about 72 wt. %, from about 60 wt. % to about 70 wt. %, or from about 65 wt. % to about 70 wt. %. A total soluble carbohydrate content of less than 10 wt. %, less than 5 wt. %, about 2.5 wt. %, about 3 wt. %, about 3.5 wt. %, about 4 wt. %, about 4.5 wt. %, about 5 wt. %, about 5.5 wt. %, or about 6 wt. %, and ranges constructed therefrom, such as from about 2.5 wt. % to about 6 wt. %, or from about 3 wt. % to about 5 wt. %. A total oil content of about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. % or about 1.5 wt. %, and ranges constructed therefrom, such as from about 0.5 wt. % to about 1.5 wt. % or from about 0.7 wt. % to about 1.2 wt. %. A weight ratio of protein to oil of about or at least 50:1, about or at least 55:1, about or at least 60:1, about or at least 70:1, about or at least 80:1, about or at least 90:1, about or at least 100:1, about or at least 110:1, about or at least 120:1, about or at least 130:1, about or at least 140:1 or about 150:1, and ranges constructed therefrom, such as from about 50:1 to about 150:1, from about 55:1 to about 100:1, or from about 60:1 to about 80:1. A weight ratio of soluble carbohydrate to oil of about 2:1, about 2.5:1, about 3:1, about 3.5:1, about 4:1, about 4.5:1, about 5:1, about 5.5:1, about 6:1, about 6.5:1, about 7:1, about 7.5:1, or about 8:1, and ranges constructed therefrom, such as from about 2:1 to about 8:1, or from about 3:1 to about 5:1. A weight ratio of protein to soluble carbohydrate of about or at least 10:1, about or at least 12:1, about or at least 13:1, about or at least 14:1, about or at least 15:1, about or at least 16:1, about or at least 17:1, about or at least 18:1, about or at least 19:1, or about 20:1, and ranges constructed therefrom, such as from about 12:1 to about 20:1, or from about 14:1 to about 18:1.

Figure 2A:
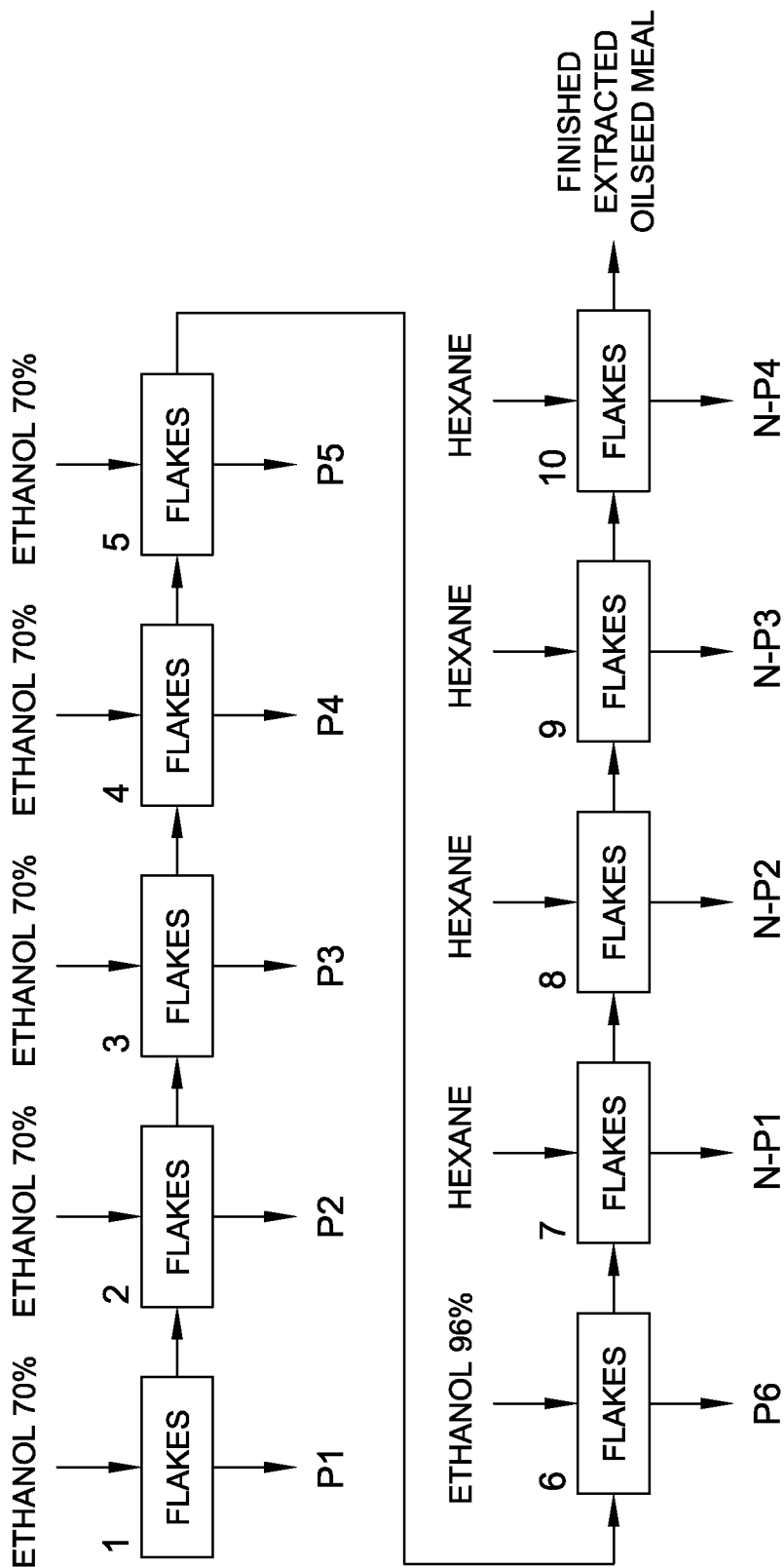
FIG. 2A depicts one aspect of the present disclosure for the extraction of soluble carbohydrates and oil from flaked oilseed by a series of five extractions with a solvent comprising 70% ethanol and 30% water to produce extraction solvent comprising soluble carbohydrates (P1 to P5) and extracted flakes, followed by extraction of the flakes with an ethanol/water azeotrope to produce extraction solvent comprising soluble carbohydrates (P6) and extracted flakes, followed by a series of four extractions with hexane to produce miscella comprising hexane and oil (N-P1 to N-P4) and extracted flake comprising high protein and low oil and soluble carbohydrates content.

One particular embodiment of the present disclosure is depicted in FIG. 2A. In step 1, full fat oilseed flake is extracted with ethanol:water 70:30 to produce extraction solvent P1 and extracted oilseed. In step 2, the oilseed extracted in step 1 is further extracted with ethanol:water 70:30 (Ethanol 70%) to produce extraction solvent P2 and extracted oilseed. In step 3, the oilseed extracted in step 2 is further extracted with ethanol:water 70:30 to produce extraction solvent P3 and extracted oilseed. In step 4, the oilseed extracted in step 3 is further extracted with ethanol:water 70:30 to produce extraction solvent P4 and extracted oilseed. In step 5, the oilseed extracted in step 4 is further extracted with ethanol:water 70:30 to produce extraction solvent P5 and extracted oilseed. In step 6, the oilseed extracted in step 5 is further extracted with azeotropic ethanol:water 96:4 (Ethanol 96%) to produce extraction solvent P6 and extracted oilseed. In step 7, the oilseed extracted in step 6 is further extracted with hexane to produce extraction solvent N-P1 and extracted oilseed. In step 8, the oilseed extracted in step 7 is further extracted with hexane to produce extraction solvent N-P2 and extracted oilseed. In step 9, the oilseed extracted in step 8 is further extracted with hexane to produce extraction solvent N-P3 and extracted oilseed. In step 10, the oilseed extracted in step 9 is further extracted with hexane to produce extraction solvent N-P4 and finished extracted oilseed. A counter-current extraction scheme of the scheme depicted in FIG. 2A is also within the scope of the present disclosure.

Figure 2B:
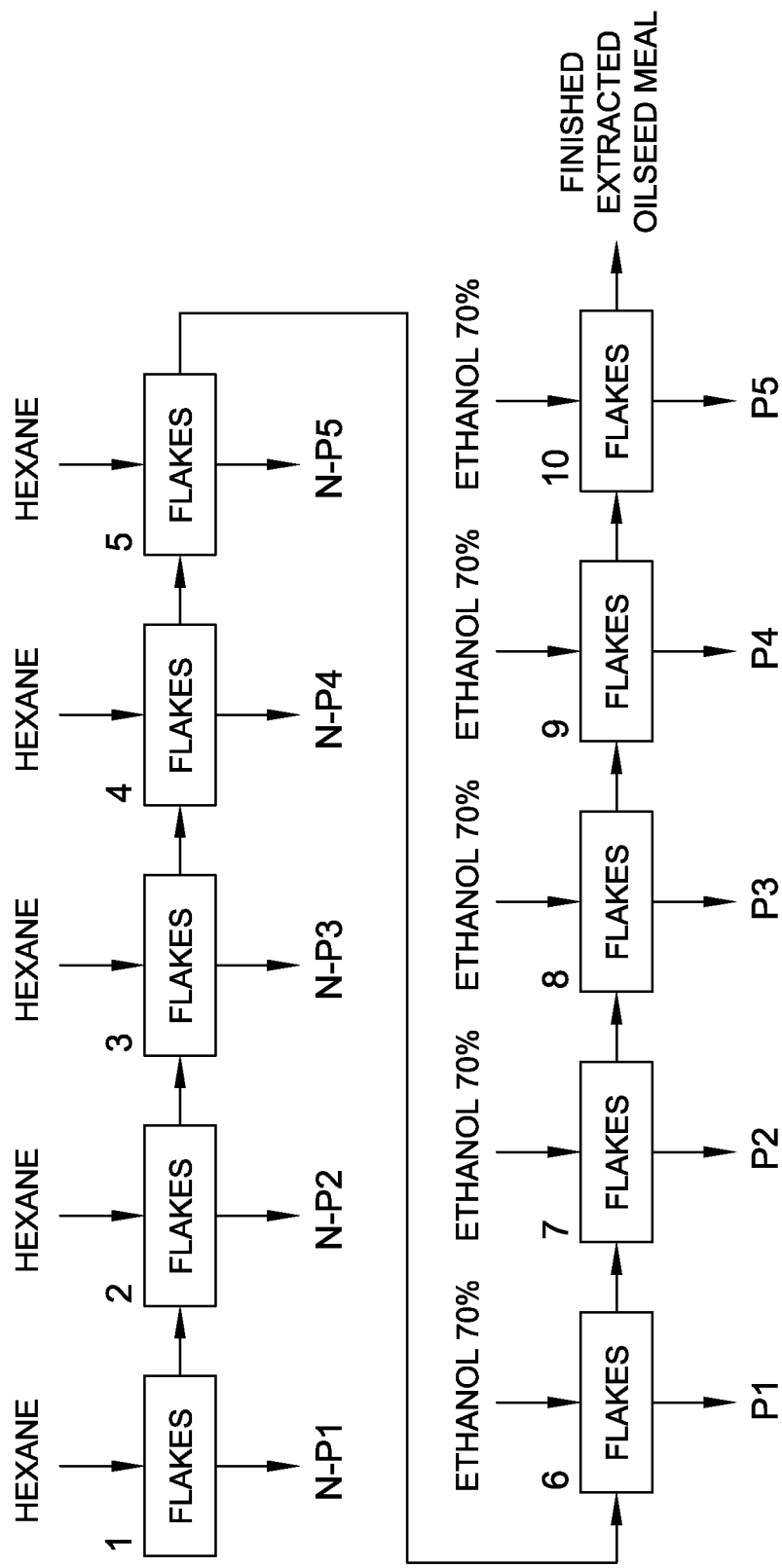
FIG. 2B depicts one aspect of the present disclosure for the extraction of soluble carbohydrates and oil from flaked oilseed by a series of five extractions with hexane to produce extraction solvent comprising oil (N-P1 to N-P5) and extracted flakes, followed by a series of five extractions of the flakes with a solvent comprising 70% ethanol and 30% water to produce extraction solvent comprising soluble carbohydrates (P1 to P5) and extracted flakes with high protein, low oil and soluble carbohydrates content.

One particular embodiment of the present disclosure is depicted in FIG. 2B. In step 1, full fat oilseed flake is extracted with hexane to produce extraction solvent N-P1 and extracted oilseed. In step 2, the oilseed extracted in step 1 is further extracted with hexane to produce extraction solvent N-P2 and extracted oilseed. In step 3, the oilseed extracted in step 2 is further extracted with hexane to produce extraction solvent N-P3 and extracted oilseed. In step 4, the oilseed extracted in step 3 is further extracted with hexane to produce extraction solvent N-P4 and extracted oilseed. In step 5, the oilseed extracted in step 4 is further extracted with hexane to produce extraction solvent N-P5 and extracted oilseed. In step 6, the oilseed extracted in step 5 is further extracted with ethanol:water 70:30 (Ethanol 70%) to produce extraction solvent P1 and extracted oilseed. In step 7, the oilseed extracted in step 6 is further extracted with ethanol:water 70:30 to produce extraction solvent P2 and extracted oilseed. In step 8, the oilseed extracted in step 7 is further extracted with ethanol:water 70:30 to produce extraction solvent P3 and extracted oilseed. In step 9, the oilseed extracted in step 8 is further extracted with ethanol:water 70:30 to produce extraction solvent P4 and extracted oilseed. In step 10, the oilseed extracted in step 9 is further extracted with ethanol:water 70:30 to produce extraction solvent P5 and finished extracted oilseed. A counter-current extraction scheme for the scheme depicted in FIG. 2B is also within the scope of the present disclosure.

In some aspects of the present disclosure, the oilseed extraction method comprises simultaneous extraction of oil and soluble carbohydrates from flaked oilseed meal with an azeotrope of an organic polar solvent and a non-polar solvent. Use of a single phase azeotrope further overcomes issues involved with non-azeotropic phase separation of admixtures of an organic polar solvent and a non-polar solvent.

The azeotropic extraction may comprise at least one extraction, or multiple extractions. The azeotropic extraction scheme may suitably be a batch extraction, a semi-continuous extraction or a continuous extraction. In some embodiments, the azeotropic extraction is counter-current.

Suitable azeotropes of organic polar and non-polar solvents are described elsewhere herein. In some embodiments, the azeotrope is hexane/ethanol or hexane/methanol. In some embodiments, the azeotrope is hexane/methanol.

In some embodiments, 1 extraction or 2, 3, 4, 5, 6, 7, 8, 9, 10, 11 or 12 sequential extractions, and ranges constructed therefrom, such as 2 to 12 extractions, 3 to 10 extractions, 5 to 9 extractions, or 6 to 8 extractions of oilseed with the azeotrope may be done. A counter-current extraction scheme may optionally be done.

In any of the various oil extractions, the weight ratio of the azeotrope to oilseed is about 0.5:1, about 0.75:1, about 1:1, about 1.1:1, about 1.5:1, about 2:1, about 2.5:1, about 3:1, about 3.5:1 or about 4:1, and ranges constructed therefrom, such as from about 0.5:1 to about 4:1, from about 1:1 to about 3:1, from about 1.1:1 to about 3:1, from about 1.1:1 to about 2:1, or from about 1.1:1 to about 1.5:1. In some such embodiments, the azeotrope in at least one extraction step is present in wt. % excess as compared to the oilseed meal. In some embodiments, the azeotrope in each extraction step is present in wt. % excess as compared to the oilseed meal.

The azeotropic extraction temperature is suitably about 25° C., about 30° C., about 35° C., about 40° C., about 45° C., about 50° C., about 55° C., about 60° C., about 65° C., about 70° C., up to about 5° C. less than the boiling point of the azeotrope, and ranges constructed therefrom, such as from about 25° C. to about 5° C. less than the solvent boiling point, from about 40° C. to about 5° C. less than the solvent boiling point, from about 40° C. to about 70° C., from about 45° C. to about 60° C., or from about 50° C. to about 55° C.

In any of the various azeotropic extraction embodiments, at least 60 wt. %, at least 65 wt. %, at least 70 wt. %, at least 75 wt. %, at least 80 wt. %, at least 85 wt. %, or at least 90 wt. % of the oil contained in the full-fat oilseed meal is extracted into the non-polar solvent.

In any of the various soluble carbohydrate extraction embodiments, at least 50 wt. %, at least 60 wt. %, at least 70 wt. %, at least 80 wt. % or at least 90 wt. % of the soluble carbohydrate contained in the oilseed meal is extracted into the polar solvent.

In any of the various azeotropic extraction embodiments, the extracted oilseed meal, may be characterized as follows. A total protein content of about 50 wt. %, about 52 wt. %, about 54 wt. %, about 56 wt. %, about 58 wt. %, about 60 wt. %, about 62 wt. %, about 64 wt. %, about 66 wt. %, about 68 wt. %, about 70 wt. %, or about 72 wt. %, and ranges constructed therefrom, such as from about 50 wt. % to about 72 wt. %, from about 52 wt. % to about 66 wt. %, or from about 54 wt. % to about 64 wt. %, from about 60 wt. % to about 72 wt. %, or from about 62 wt. % to about 70 wt. %. A total oil content of about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. % or about 1.5 wt. %, and ranges constructed therefrom, such as from about 0.5 wt. % to about 1.5 wt. %, from about 0.6 wt. % to about 1 wt. %, or from about 0.7 wt. % to about 0.9 wt. %. A total soluble carbohydrate content of less than 14 wt. %, less than 12 wt. %, 10 wt. %, less than 5 wt. %, about 2.5 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, or about 14 wt. %, and ranges constructed therefrom, such as from about 2.5 wt. % to about 14 wt. %, from about 2.5 wt. % to about 10 wt. %, from about 5 wt. % to about 10 wt. %, from about 2.5 wt. % to about 5 wt. %. A weight ratio of protein to oil of about or at least 50:1, about or at least 55:1, about or at least 60:1, about or at least 70:1, about or at least 80:1, about or at least 90:1, about or at least 100:1, about or at least 110:1, about or at least 120:1, about or at least 130:1, about or at least 140:1 or about 150:1, and ranges constructed therefrom, such as from about 50:1 to about 150:1, from about 55:1 to about 100:1, or from about 60:1 to about 80:1. A weight ratio of soluble carbohydrate to oil of about 5:1, about 7.5:1, about 10:1, about 12.5:1, about 15:1, about 17.5:1, about 20:1, about 22.5:1, about 25:1, about 27.5, or about 30:1, and ranges constructed therefrom, such as from about 5:1 to about 30:1, from about 10:1 to about 25:1, or from about 12.5:1 to about 20:1. A weight ratio of protein to soluble carbohydrate of about or at least 4:1, about or at least 4.5:1, about or at least 5:1, about or at least 5.5:1, about or at least 6:1, about or at least 6.5:1, about or at least 7:1, about or at least 7.5:1, about or at least 8:1, about or at least 8.5:1, about or at least 9:1, about or at least 9.5:1, or about 10:1, and ranges constructed therefrom, such as from about 4:1 to about 10:1, from about 4:1 to about 8:1, or from about 4.5:1 to about 6:1.

In any of the various aspects of the present disclosure, oilseed meal having oil and soluble carbohydrates extracted therefrom may be desolventized or desolventized/toasted by methods known in the art.

EXAMPLES

Figure 3:
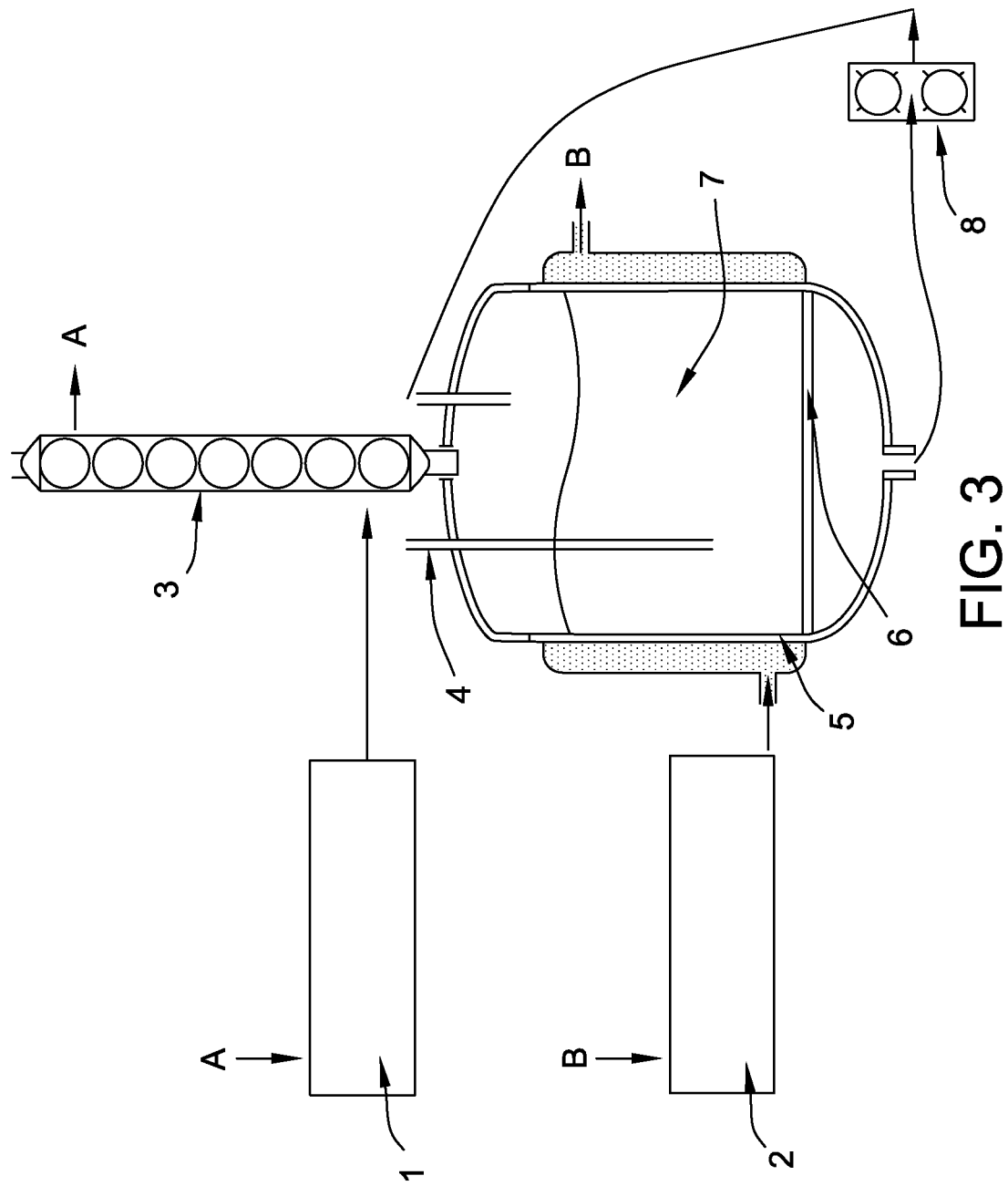
FIG. 3 depicts an experimental apparatus for extraction of oilseed flakes with solvent.

The example extractions 1 and 2 were done using the extraction system depicted in FIG. 3. Water chiller 1 was a model RC-2 chiller available from IKA. Water heater 2 was a model T151E available from Brabender. The jacketed extractor had a volume of 1.2 liters, and pump 8 was a Watson-Marion 120 U/DV pump, 200 rpm.

The example extractions 1 and 2 procedure involved placing full fat soybean flakes in the extractor 5 together with the solvent to form an extraction bed 7. Heated water (indicated by flow path B in FIG. 3) was circulated through the extractor jacket 5 at the desired temperature for each example extraction. Chilled water (indicated by flow path A in FIG. 3) was circulated through the condenser 3 at the desired temperature for each example extraction. The temperature of the extraction was controlled by the temperature as indicated by thermometer 4. In a solvent wash (extraction) step, after the target extraction temperature was reached, pump 8 was activated in order to circulate miscella (comprising solvent, soluble carbohydrates and oil) passing from the extraction bed 7 and through the sintered plate 6 back into the extraction bed 7. Each solvent wash time was about 15 minutes. Pump 8 rate was set to achieve a described percolation rate through the flakes.

The full fat soybean flakes used in each of the examples were prepared by cleaning, cracking, dehulling, conditioning, and flaking.

In the following examples, oil content was determined according to American Oil Chemists' Society ("AOCS") Official Method Ba 3-38 (Revised 2017) titled "Oil in Seed Meals and Cakes". In summary, sample of ground material is weighed and extracted with petroleum ether. The petroleum ether extract is collect, evaporated to remove solvent, and the resulting extracted oil is weighed. The percent oil is calculated by: (grams oil)/(grams of ground material)×100. Optionally, sample water content may be measured and the percent oil results calculated on a dry basis.

In the following examples, moisture and volatile content may be determined according to AOCS Official Method Ba 2a-38 (Revised 2017) titled "Moisture and Volatile Matter, Forced Draft Oven Method". In summary, a weighed sample of material is placed into a tared moisture dish and then placed in an oven and dried at 130±3° C. for 2 hours. The moisture dish is then removed from the oven, cooled in a desiccator to room temperature and weighed. The percent moisture and volatile matter is calculated by: (loss in mass, g)/(mass of sample, g)×100.

In the following examples, protein content was determined according to AOCS Official Method Ba 4d-90 (Revised 2017) titled "Nitrogen and Protein, Modified Kjeldahl Method". The Kjeldahl method involves heating a sample to boiling in the presence of sulphuric acid which decomposes the organic substance by oxidation and forms a solution comprising ammonium sulphate from the reduced nitrogen. The solution is then combined with sodium hydroxide and boiled to convert the ammonium sulfate to ammonia. The amount of ammonia present, and thus the amount of nitrogen present in the sample, is determined by back titration using an indicator. Percent nitrogen is calculated by:

$$\% \text{ N} = [(NA \times mLA) - (mLBK \times NB) - (mLB \times NB)] \times 1400.67/\text{mg sample}$$

where mLB=volume, mL standard base used for the sample; mLA=volume, mL standard acid used for the sample; mLBK=volume, mL standard base needed to titrate 1 mL of standard acid minus mL standard base needed to titrate reagent blank carried through the method and distilled to 1 mL standard acid; NA=normality of standard acid; and NB=normality of standard base. Total protein is calculated by N %×6.25.

In the following examples, soluble carbohydrate (sugar) content was measured by LC. Samples for sugar measurement were milled using a 0.5 mm sieve and extracted with 70% ethanol at a w:w ratio of sample to 70% ethanol of 1:10 for one hour under ambient conditions with constant stirring. Sugar content in the 70% ethanol was measured in an Agilent 1260 Infinity Liquid Chromatograph coupled with a RI detector. The column was an Hi-Plex Ca 7.7×300 mm, 8 µm; the flow was 0.6 mL/min; the time was 30 min; the injection volume was 20 µL; the column compartment temperature was 80° C.; the detector temperature was 30° C.; and the mobile phase was water.

Miscella composition was measured and determined by gas chromatography.

Comparative Example

Full fat soybean flakes were extracted by prior art hexane extraction. In the comparative example, 300 g of the full fat soybean flakes were placed in the extractor and 375 g of hexane was added. The extraction temperature was maintained at 60° C., the chilled water to the condenser was maintained at 20° C., the miscella recirculation time was 15 minutes, and the recirculation rate was 36 mL/minute. The extraction was repeated 6 times for a total of 7 extractions. The final extracted soybean flakes (i.e., after 7 hexane extractions) were analyzed for moisture, protein, oil and sugar (soluble carbohydrate). The results are reported in Table 1 below (dry basis) along with the moisture, protein, oil and sugar of the soybean flakes prior to extraction.

TABLE 1

|  | Crude Flakes (wt. %) | Extracted Flakes (wt. %) |
| --- | --- | --- |
| Moisture | 8.87 | 3.86 |
| Protein | 41.71 | 53.47 |
| Oil | 25.56 | 1.03 |
| Total Sugar | 11.93 | 14.81 |

Example 1

Full fat soybean flakes were extracted by a sequence of ethanol and water, an azeotrope of ethanol and water, and hexane as generally depicted in FIG. 2A.

300 g of the full fat soybean flakes were placed in the extractor and 375 g of a solvent mixture comprising 70 wt. % ethanol and 30 wt. % water was added. The extraction temperature was maintained at 60° C., the chilled water to the condenser was maintained at 20° C., the miscella recirculation time was 15 minutes, and the recirculation rate was 36 mL/minute. The extraction was repeated 4 times for a total of 5 extractions with 70% ethanol/30% water. The extracted soybean flakes (i.e., after five extractions with 70% ethanol/30% water) were analyzed for moisture, protein, oil and sugar (soluble carbohydrate), and the results are reported below in Table 2 as "5×70/30 EtOH/H$_2$O".

Those extracted soybean flakes were then further extracted with 375 g of an ethanol/water azeotrope (96 wt. % ethanol/4 wt. % water). The extraction temperature was maintained at 60° C., the chilled water to the condenser was maintained at 20° C., the miscella recirculation time was 15 minutes, and the recirculation rate was 36 mL/minute. The extracted soybean flakes (i.e., after one extraction with the ethanol/water azeotrope) were analyzed for moisture, protein, oil and sugar, and the results are reported below in Table 2 as "1×96/4 EtOH/H$_2$O".

Those extracted soybean flakes were then further extracted with 375 g of a hexane. The extraction temperature was maintained at 60° C., the chilled water to the condenser was maintained at 20° C., the miscella recirculation time was 15 minutes, and the recirculation rate was 36 mL/minute. The extraction was repeated 3 times for a total of 4 extractions with hexane. The extracted soybean flakes (i.e., after four extractions with hexane) were analyzed for moisture, protein, oil and sugar, and the results are reported below in Table 2 as "4× hexane".

The moisture, protein, oil and sugar of the soybean flakes prior to extraction are reported in Table 2 below (dry basis) as "Raw".

TABLE 2

|  | Raw (wt. %) | 5x 70/30 EtOH/H$_2$O (wt. %) | 1x 96/4 EtOH/H$_2$O (wt. %) | 4x hexane (wt. %) |
| --- | --- | --- | --- | --- |
| Moisture | 8.87 | 6.35 | 5.71 | 6.00 |
| Protein | 41.71 | 50.13 | 50.83 | 67.24 |
| Oil | 25.56 | 26.87 | 25.38 | 0.99 |
| Total Sugar | 11.93 | 3.99 | 3.85 | 4.00 |

Example 2

Full fat soybean flakes were extracted in a counter-current series of seven sequential extractions with a solvent comprising an azeotrope of hexane and methanol in a weight ratio of 72%:28% hexane:methanol.

As depicted in FIG. 4A, in a first step (1a) for generating solvent (miscella) to be used in a second step counter-current extraction scheme (below), 300 g of the full fat soybean flakes were placed in the extractor and 375 g of the fresh hexane:methanol solvent was added. The extraction temperature was maintained at 52° C., the chilled water to the condenser was maintained at 20° C., the miscella recirculation time was 15 minutes, and the recirculation rate was 36 mL/minute. The miscella generated in the first extraction was designated as "M1" and the extracted soybean flakes were designated as "1× Flakes". The flakes were extracted sequentially with fresh hexane:methanol six more times (steps 2a to 7a) to generate miscella designated as "M2" to "M7", respectively, and extracted flakes designated as "2× Flakes" to "7× Flakes", respectively.

As depicted in FIG. 4B, in a second step counter-current extraction scheme, 300 g of the full fat soybean flakes were placed in the extractor and the "M2" miscella was added. The extraction temperature was maintained at 52° C., the chilled water to the condenser was maintained at 20° C., the miscella recirculation time was 15 minutes, and the recirculation rate was 36 mL/minute. The miscella generated in the first extraction (step 1b) was designated as "M1b" and the extracted soybean flakes were designated as "1×b Flakes". The extraction was repeated 6 times (steps 2b to 7b, for a total of 7 extractions) with M3 to M7 and fresh hexane:methanol, respectively, to generate 2×b Flakes to 7×b Flakes, respectively. The final extracted soybean flakes (i.e., 7×b Flakes) were analyzed for moisture, protein, oil and sugar (soluble carbohydrate), and the results are reported below in Table 3 (dry basis) along with the moisture, protein, oil and sugar of the soybean flakes prior to extraction.

TABLE 3

|  | Crude Flakes (wt. %) | 7xb Flakes (wt. %) |
| --- | --- | --- |
| Moisture | 8.87 | 6.03 |
| Protein | 41.71 | 58.46 |
| Oil | 25.56 | 0.81 |
| Total Sugar | 11.93 | 12.94 |

Example 3

Figure 5:
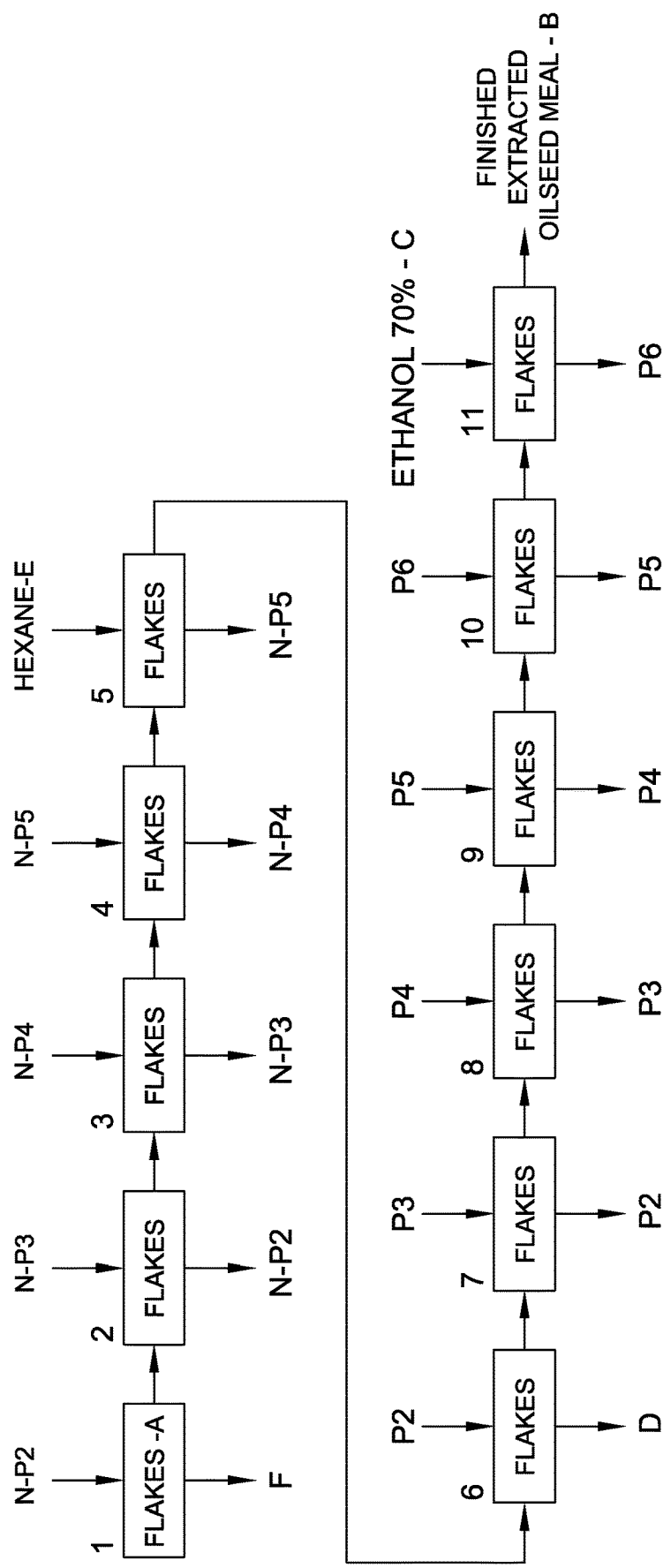
FIG. 5 depicts the extraction protocol of the example 3, were A is the initial full fat flakes, B is the resulting extracted flakes, C is the mixture 70% ethanol and 30% water, D is the resulting solvent comprising mainly carbohydrates, E is fresh hexane and F is the resulting solvent comprising mainly oils. The streams N-P2 to N-P5 are intermediate hexane/oil streams and P2 to P6 are intermediate streams comprising mainly ethanol and sugar.

Example 3, as depicted in FIG. 5, evaluated continuous, counter-current extraction of full fat soybean flakes with solvents in sequence: hexane followed by 70% ethanol/30% water (70% Ethanol). The evaluation consisted of an initial 5 stages of extraction with hexane E (steps 1 to 5) that was recirculated counter current generating the intermediate streams N-P5, N-P4, N-P3, N-P2 and F. Subsequently, 6 counter-current stage extractions with 70% ethanol C (steps 6 to 11) were done generating the intermediate streams P6, P5, P4, P3, P2 and D as presented in FIG. 5 where: A represents the full fat flakes; B represents the extracted meal; E represents the fresh hexane; F represents hexane with oil; C represents fresh ethanol/water 70%/30%; and D represents ethanol containing sugars and minor quantities of hexane, oils and proteins.

The process conditions of the test were as follows. The solvent for the first extraction sequence was hexane; the solvent for the first extraction sequence was 70% ethanol/30% water; the solvent ratio was hexane (3:1) and ethanol (4:1); the raw material was full fat soybean flakes; the feed rate was 136-181 grams per minute; the retention time was 180 minutes total with 60 minutes for hexane and 90 minutes for ethanol+drainages; and the solvent temperature was 60° C. for hexane and 71° C. for ethanol.

The extractions were done in a Crown Model V 12-stage continuous, counter-current extractor having continuous paddle motion over stationary relieved screen. Some of the extractor stages were deactivated to simulate the desired number of wash and/or drainage steps. Meal desolvention was done in a downdraft desolventizer ("DDD") having gentle motion, vacuum, and indirect heat, and allowing for residence time control.

The final extracted soybean flakes B and the initial full fat flakes were analyzed for moisture, protein, oil and total sugar (soluble carbohydrate–stachyose+raffinose+sucrose+glucose+galactose), and the results are reported below in Table 4 (dry basis).

TABLE 4

|  | Crude Flakes - A (wt. %) | Finished Extracted Meal - B (wt. %) |
|---|---|---|
| Moisture | 11.3 | 20.06 |
| Protein | 41.93 | 67.62 |
| Oil | 24.69 | 0.23 |
| Stachyose | 5.58 | 1.55 |
| Raffinose | 2.49 | 0.16 |
| Sucrose | 5.77 | 0.17 |
| Glucose | 0.3 | 0 |
| Galactose | 0.4 | 0 |
| Total Sugar | 14.59 | 1.88 |

Example 4

Example 4 evaluated 7-step continuous, counter-current extraction of full fat soybean flakes (A) with an azeotrope of 72 w/w % hexane and 28 w/w % methanol. In the evaluation, a 6× extracted soybean meal was extracted with fresh azeotropic solvent (72% hexane/28% methanol) to generate finished extracted meal (processed by DDD) and 1× solvent; 5× extracted soybean meal was extracted with the 1× solvent to generate 2× solvent and the 6× extracted meal; 4× extracted soybean meal was extracted with 2× solvent to generate 3× solvent and the 5× extracted meal; 3× extracted soybean meal was extracted with the 3× solvent to generate 4× solvent and the 4× extracted meal; 2× extracted soybean meal was extracted with the 4× solvent to generate 5× solvent and the 3× extracted meal; 1× extracted soybean meal was extracted with the 5× solvent to generate 6× solvent and the 2× extracted meal; and the full fat soybean flakes were extracted with the 6× solvent to generate extractor discharge solvent (miscella) and the 1× extracted soybean meal. The finished extracted meal was process in a DDD as per Example 3. The scheme for Example 4 is depicted below:

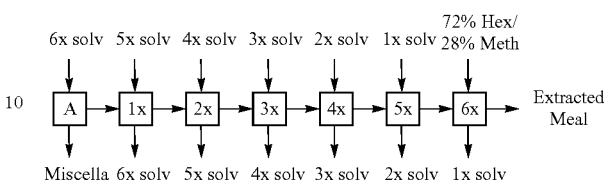

In the extraction, the solvent ratio was 3:1; the feeding rate was 372 g/minute; the retention time was 60 minutes total+drainages; the solvent temperature was 55° C.; and the DDD retention time, temperature and vacuum were 15 minutes, 93° C., and 10 mm Hg, respectively.

The results are reported below in Table 5 (dry basis) for the crude flakes, finished extracted meal, and 6× solvent (miscella).

TABLE 5

|  | Crude Flakes - (wt. %) | Finished Extracted Meal - (wt. %) | Miscella (wt. %) |
|---|---|---|---|
| Moisture | 8.89 | 2.93 | 36.42 |
| Hexane | 0 | 0 | 6.67 |
| Methanol | 0 | 0 | 18.11 |
| Protein | 41.78 | 50.27 | 49.43 |
| Oil | 23.63 | 14.39 | 15.48 |
| Stachyose | 4.62 | 5.34 | 5.31 |
| Raffinose | 2.25 | 2.46 | 2.47 |
| Sucrose | 5.32 | 4.41 | 4.64 |
| Glucose | 0.38 | 0.37 | 0.37 |
| Galactose | 0.36 | 0.2 | 0.21 |
| Fructose | 0.09 | 0 | 0 |
| Total Sugar | 13.02 | 12.77 | 13.01 |

The results for Example 4 show that the oil was not efficiently extracted and the miscella contained an excess of methanol. As compared to Example 2 where full fat soybean was efficiently extracted with an azeotrope, based on experimental results to date and without being bound by any particular theory, it is believed that the hexane:methanol azeotrope was not maintained in example 4 thereby leading to solvent phase separation and inefficient extraction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for extracting oil and soluble carbohydrates from oilseeds to form extracted oilseed meal, the method comprising processing full-fat flaked oilseed according to step (a) followed by step (b):
    (b) at least one soluble carbohydrate extraction step comprising (i) contacting crude extracted oilseed meal with an alcohol and water and (ii) separating alcohol and water to form extraction alcohol comprising soluble carbohydrates, and finished extracted oilseed meal; and (a) at least one oil extraction step comprising (i) contacting full-fat flaked oilseed comprising oil, protein and soluble carbohydrates with a non-polar solvent and (ii) separating non-polar solvent to form extraction non-polar solvent comprising oil and crude extracted oilseed meal, wherein the water content in the alcohol and water in step (b) is from about 15 wt. % to about 50 wt. %, wherein the method is characterized by the absence of a desolventizing and toasting step prior to step (b), wherein the extraction alcohol comprises at least 80 wt. % of the soluble carbohydrates contained in the solid full-fat flaked oilseed, wherein the extraction non-polar solvent comprises at least 75 wt. % of the oil contained in the solid full-fat flaked oilseed, wherein the finished extracted oilseed meal is characterized by a wt. % ratio of protein to oil of at least 55:1 and a wt. % ratio of protein to carbohydrate of at least 10:1, and wherein the solid full-fat flaked oilseed has not been previously extracted with a solvent or previously heat treated.

2. The method of claim 1 wherein the solvent in at least one extraction step is present in wt. % excess as compared to the oilseed meal.

3. The method of claim 1 wherein the solvent in each extraction step is present in wt. % excess as compared to the oilseed meal.

4. The method of claim 1 wherein the weight ratio of solvent to flaked oilseed in at least one extraction step is from about 1.1:1 to about 4:1.

5. The method of claim 1 wherein the protein content of the finished extracted oilseed meal is greater than 55 wt. %.

6. The method of claim 1 wherein the soluble carbohydrate content of the finished extracted oilseed meal is less than 10 wt. %.

7. The method of claim 1 wherein the oil content of the finished extracted oilseed meal is less than 2 wt. %.

8. The method of claim 1 wherein:

the at least one soluble carbohydrate extraction step comprises multiple extractions comprising from 1 to 8 sequential extractions with a binary mixture of from about 60 wt. % ethanol to about 80 wt. % ethanol, and from about 40 wt. % water to about 20 wt. % water; and the at least one oil extraction step comprises multiple extractions comprising from 1 to 6 sequential extractions with hexane.

9. The method of claim 1 wherein:

The at least one soluble carbohydrate extraction step comprises from 3 to 7 sequential extractions with a binary mixture of from about 70 wt. % ethanol and from about 30 wt. % water; and the at least one oil extraction step comprises multiple from 2 to 5 sequential extractions with hexane.

10. The method of claim 1 wherein sequential alcohol extractions are conducted in a counter-current scheme.

11. The method of claim 1 wherein sequential non-polar solvent extractions are conducted in a counter-current scheme.

12. The method of claim 1 wherein the extraction alcohol comprises at least 90 wt. % of the soluble carbohydrates contained in the solid full-fat flaked oilseed.

* * * * *

UNITED STATES PATENT AND TRADEMARK OFFICE
CERTIFICATE OF CORRECTION

| | |
|---|---|
| PATENT NO. | : 11,254,895 B2 |
| APPLICATION NO. | : 16/567493 |
| DATED | : February 22, 2022 |
| INVENTOR(S) | : Rogerio Pereira Machado and Fabiano Luft Ferreira |

It is certified that error appears in the above-identified patent and that said Letters Patent is hereby corrected as shown below:

On the Title Page

Item (73) Assignee, delete "Bungle Global Innovation, LLC" and insert therefor -- Bunge Global Innovation, LLC --.

Signed and Sealed this
Twenty-second Day of August, 2023

*Katherine Kelly Vidal*

Katherine Kelly Vidal
*Director of the United States Patent and Trademark Office*